June 24, 1930. A. A. THOMAS 1,768,168
ELECTRIC TRANSMITTER
Filed Dec. 16, 1927
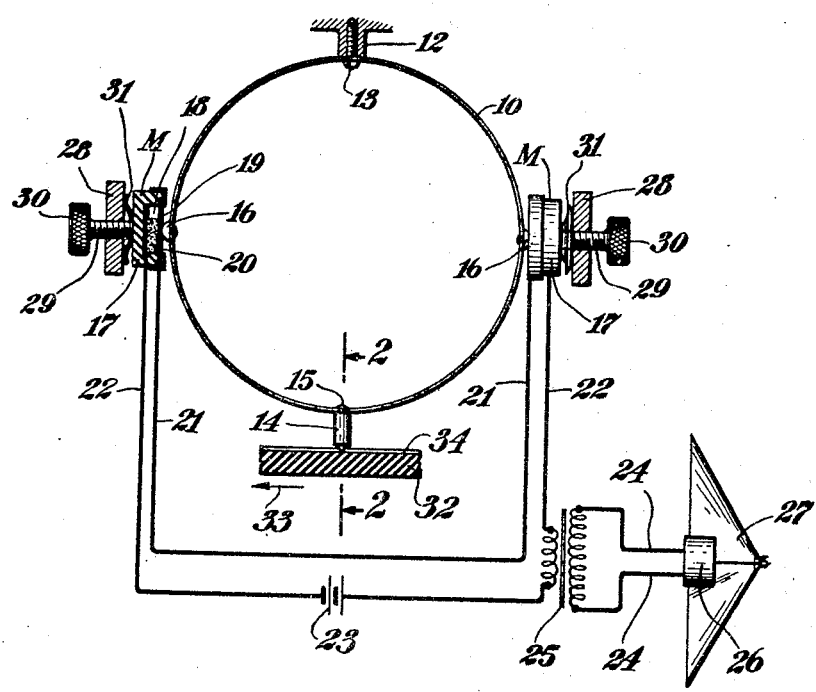
INVENTOR
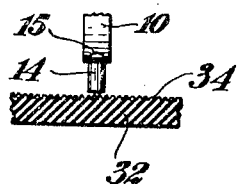
Adolph A. Thomas Patented June 24, 1930

1,768,168

UNITED STATES PATENT OFFICE

ADOLPH A. THOMAS, OF NEW YORK, N. Y.

ELECTRIC TRANSMITTER

Application filed December 16, 1927. Serial No. 240,389.

This invention is for an electric transmitter of the microphone type embodying novel features to provide an instrument of simple construction and great sensitivity. Briefly stated, my new transmitter comprises an elastic vibratory ring adapted to vibrate in its own plane and thereby operate microphonic means for producing current impulses in a suitable circuit. The elastic ring is supported at a fixed point in its circumference and is actuated at a point which preferably is diametrically opposite the point of support. Microphone mechanism is arranged in contact with the elastic ring on a diametric line substantially at right angles to the two points previously mentioned. Consequently, as a vibratory actuating force is applied to the elastic ring opposite its point of support, the ring is deformed in its own plane by vibratory movements which vary the pressure contact of the ring against the microphone mechanism, which is supported independently of the ring. The result is the production of current impulses in the microphone circuit in accordance with the vibrations of the ring. The utter absence of lost motion makes this device extremely sensitive. The actuating means for the elastic ring may be a phonograph stylus, an acoustic diaphragm, or any other vibratory member whose movements are to be converted into electric impulses.

A simple form of my invention is shown in the accompanying drawings, in which—

Fig. 1 is a semi-diagrammatic view, partly in section, of a phonograph pickup constructed in accordance with my invention; and Fig. 2 is a detailed view on section line 2—2 of Fig. 1.

An elastic ring 10 is connected at a point in its circumference to a fixed support 12, as by means of a screw 13, or in any other practical way. The support 12, which is indicated merely in a diagrammatic way, can be considered as part of a casing in which the parts of the instrument are housed. I have purposely omitted to show a complete casing in order to promote clearness in the illustration.

A stylus holder 14 is rigidly attached to ring 10 at a point diametrically opposite the supporting point 13. When I say that the members 13 and 14 lie in a diametric line, I use the expression in an approximate sense and not in a strictly mathematical definition. In my opinion the best results are obtained if the actuating member 14 is connected to the elastic ring 10 at a point as closely diametrically opposite the supporting point 13 as practical conditions permit. The stylus holder 14 is secured to the ring in any suitable way, as by a member 15, which may be a bolt, screw, rivet, or the like. In the present instance, the stylus holder 14 is adapted to play vertical-cut records of the Edison type, and so the stylus will be the usual diamond point, with which Edison reproducers have heretofore been provided.

The elastic ring 10 carries a pair of rounded contact buttons 16, preferably of hard metal or composition, arranged on a diameter substantially at right angles to the diametric line connecting the points 13 and 15. The buttons 16 operate a pair of microphones indicated as a whole by M. These microphones may be of any practical construction, of which several makes are available in the market. By way of example, I have shown a form of microphone consisting of a cup or casing 17 having a chamber 18 closed by a vibratory diaphragm 19. The chamber 18 is partly filled with carbon granules 20. The vibratory movements of diaphragm 19 vary the resistance of the granules to set up corresponding current impulses in the microphone circuit, as will be understood without further explanation. Conductors 21 and 22 connect the two microphones in series in the circuit of battery 23, which is to be considered as representing any practical source of substantially constant potential. The battery circuit is connected to a suitable work circuit 24 by an amplifying transformer 25. The circuit 24 operates an electric driving unit 26 for actuating a loudspeaking diaphragm 27. It will be understood that the parts 26 and 27 represent diagrammatically any suitable loudspeaker mechanism, and the step-up transformer 25 indicates any suitable means for amplifying the current impulses of the microphone circuit 21—22.

The microphones M are supported by members 28, which may be regarded as portions of the casing in which the instrument is enclosed. In order to regulate the initial or normal pressure of the contact buttons 16 against the diaphragms 19, the microphones are mounted adjustably on the supports 28. A convenient way of obtaining this adjustment is to provide the microphones with bolts or screw-threaded extensions 29, which are in screw engagement with supports 28. A knob 30 facilitates turning of each member 29 in either direction to move the microphones toward or away from the contact buttons 16. The screw-threaded engagement between parts 28 and 29 is preferably of micrometer fineness, so that very delicate adjustments are possible. It may be advisable in some cases to interpose springs 31 between cups 17 and supports 28 to hold the microphones firmly in adjusted position, so that they cannot rattle or work loose during the vibrations of diaphragms 19. The spring members 31 may be in the form of spiders, spring washers, elastic cups, or of any other practical design.

The relative mounting and arrangement of the elastic ring 10 and microphones M are such that the buttons 16 are always in pressure contact with the diaphragms 19 during the vibrations of the ring. When the device is used as an electric pickup for vertical-cut records, the ring 10 is mounted in substantially vertical position, so that the stylus holder 14 vibrates up and down in playing a record. In Fig. 1 the record 32, a fragment of which is shown in cross-section along the groove, is supposed to rotate clockwise, as is usual in phonographs, and this movement is indicated by an arrow 33. The section of record 32 shown in Fig. 2 is at right angles to that of Fig. 1, and so the spiral groove 34 is seen in transverse or radial cross-section. Whenever the stylus holder 14 moves up, it pushes the buttons 16 outwardly against the associated microphone diaphragms 19, so that the resistance of both microphones is decreased. Conversely, whenever the stylus member 14 moves down, the pressure of ring 10 against the microphones is decreased and the resistance of the circuit is correspondingly increased. In other words, the vertical movements of stylus holder 14 produce deformational movements of the elastic ring 10 in its own plane and thereby vary the diameter that connects the contact buttons 16. The pressure variations between ring 10 and microphones M produce corresponding variations in the resistance of the microphone circuit, thereby setting up current impulses which are amplified to operate suitable reproducing mechanism.

It should be noticed that the movements of the stylus as controlled by the record groove are transmitted without lost motion to the microphones through the medium of the elastic ring 10, so that the resistance variations in the microphone circuit are strictly in accordance with the undulations of the record grooves. The use of two microphones in series gives an amplifying effect in resistance variation, because the microphones are simultaneously operated by the elastic ring 10 to produce a cumulative effect, due to the fact that the resistance values of the microphones are either simultaneously increased or simultaneously decreased. While two microphones are on this account preferable, I would have it understood that a single microphone may be used. It is important to notice that the microphone mechanism (whether one or two microphone units are used) is supported independently of ring 10. This has several practical advantages. First, it relieves the vibratory ring of the dead weight of the microphone (or microphones), so that the light elastic ring is free to respond instantly and correctly to all vibrations. Secondly, the independent support of the microphones provides an abutment against which the ring 10 presses at all times, whereby the slightest variations of the diameter along the two contact points 16 affect the microphones. Furthermore, the normal pressure between the ring 10 and the microphone diagrams can be regulated to obtain the best results in any particular instrument.

The vibratory ring 10 may be constructed of suitable elastic material, metallic or non-metallic. If the ring is made of spring metal, such as steel, phosphor bronze and the like, it can be utilized as an electric conductor for connecting the microphone diaphragms in circuit. If the ring 10 is to be non-metallic, suitable material would be celluloid, wood, hard rubber, and others along this line possessing the requisite strength and elasticity. When I speak of the elastic member 10 as a ring, I do not necessarily mean a perfect circle, but I include all equivalent structures, such as ellipses, ovals, and other geometric figures which an elastic strip or ribbon may assume for operation in accordance with my invention. Nor need the member 10 be an endless band, for it may be bent into shape from a straight strip whose ends are brought together at the point of support. The dimensions of the ring will naturally depend upon the kind of material used and the degree of elasticity best suited for any given case. This matter lies within the practical skill of the artisan in this line of science.

In operating as an electric pickup, my invention has several practical advantages over prior devices of that kind on account of its lightness, simplicity and sensitiveness. The absence of a magnet, armature and coil reduces the weight of the instrument so that the stylus will not bear with too much pressure on the record. It is a fact that electromagnetic reproducers heretofore employed are so heavy that they not only slow down the rotation of the turntable, but produce very marked needle noises due to the excessive pressure with which the needle point must operate in the record groove. These disadvantages are obviated in the pickup of my invention. The elastic ring 10 has such a low inertia that it responds instantly and faithfully to the minutest movements of the stylus, so that the resultant current impulses are true electrical representations of the sound recorded on the phonograph record.

Although I have shown a specific form of microphone, I want it understood that any other practical form or type of microphonic means may be used for operation by the elastic ring 10. The contact buttons 16 may not in all cases be necessary, and when used they may be attached to the microphone diaphragms instead of to the ring. The stylus holder 14 represents any practical means for holding a stylus in correct playing position. For vertical-cut records of the Pathe type, the stylus would be a sapphire ball, or similar member. For playing lateral-cut records, the stylus member 14 is replaced by a needle arm pivoted to the reproducer casing and connected to the elastic ring 10 at 15, as will be understood without additional illustration.

In the basic aspect of my invention, the elastic ring 10 may be actuated by any other means than a phonographic stylus member. For instance, in using my invention as a telephone transmitter, it is only necessary to attach a diaphragm at or near the point 15. I need hardly mention the obvious fact that the drawing shows the instrument, particularly the ring 10, in grossly exaggerated form. The actual device is very light and compact; indeed, it need not be bigger than an ordinary watch when built as a phonograph pickup.

Although I have shown and described a specific construction, I want to make it clear that my invention is not limited to the details set forth. I have no doubt that changes and modifications will occur to those skilled in the art in constructing my invention, without departing from the scope thereof as defined in the appended claims.

I claim as my invention:

1. The combination of an elastic ring mounted to vibrate in its own plane by deformational movements, a stylus member for actuating said ring, a microphone operated by said ring, and means for supporting said microphone independently of said ring and in contact therewith.

2. An electric transmitter comprising an elastic ring mounted to vibrate in its own plane by deformational movements, a stylus member for actuating said ring, a support to which said ring is attached at a point in its circumference, vibratory acoustic means connected to said ring diametrically opposite said point of support, a variable resistance device mechanically controlled by the vibrations of said ring, and means for supporting said resistance device independently of said ring.

3. An electric transmitter comprising an elastic ring supported at its circumference and deformable in its own plane for vibratory movement, a stylus member connected to said ring opposite its point of support for vibrating said ring, and microphonic means supported independently of said ring for converting the vibrations of said ring into electric impulses.

4. The combination of a microphone, an elastic ring deformable in its own plane to operate said microphone, means for rigidly supporting said microphone independently of said ring, which is thereby in variable pressure contact with the microphone, and a stylus member connected to said ring.

5. An electric phonograph pickup comprising an elastic ring supported at its circumference and deformable in its own plane for vibratory movement, a stylus connected to said ring at a point substantially diametrically opposite the supporting point of said ring, and a microphone mechanically controlled by the vibrations of said ring, said microphone being supported independently of said ring.

6. An electric transmitter comprising an elastic ring supported at its circumference and deformable in its own plane for vibratory movement, a stylus member for vibrating said ring, and a pair of microphones supported independently of said ring and having vibratory electrodes in operative contact with said ring at diametrically opposite points.

7. The combination of an elastic ring mounted to vibrate in its own plane by deformational movements, a stylus member for actuating said ring, a pair of series-connected microphones operated simultaneously by the vibrations of said ring, and means for supporting said microphones independently of said ring.

8. An electric transmitter comprising an elastic ring supported at its circumference and deformable in its own plane for vibratory movement, a stylus member connected to said ring at a point substantially diametrically opposite said point of support, and microphonic means actuated by the vibrations of said ring and supported independently of the ring.

9. The combination of a circuit of substantially constant potential, an elastic ring deformable in its own plane for vibratory movement, a support to which said ring is attached at its circumference, vibratory actuating means independent of said support and connected to said ring diametrically opposite said point of support, and variable resistance means included in said circuit and arranged to be mechanically controlled by the deformational movements of said ring to produce current impulses in said circuit, said resistance means being supported independently of said ring.

10. An electric transmitter comprising an elastic ring mounted to vibrate in its own plane, a stylus member for actuating said ring, microphone mechanism in pressure contact with said ring and arranged to be operated by the vibrations of said ring, means for supporting said mechanism independently of said ring, and means for adjusting said normal pressure contact.

11. An electric phonograph reproducer comprising an elastic ring mounted to vibrate in its own plane by deformational movements, a stylus connected to said ring to vibrate the same, said ring being of such low inertia as to respond properly to all movements of said stylus, and variable resistance means controlled by the vibrations of said ring to produce current impulses in accordance with the stylus vibrations, said resistance means being supported independently of said ring.

12. An electric phonograph reproducer comprising an elastic ring supported at its circumference and deformable in its own plane for vibratory movement, a stylus connected to said ring for vibrating the same, and microphonic means supported independently of said ring and controlled by the vibrations thereof.

13. The combination of a circuit of substantially constant potential, a pair of microphones connected in series in said circuit, an elastic ring supported at a fixed point in its circumference and adapted to vibrate in its own plane, means independent of said ring for mounting said microphones in pressure contact with said ring at opposite points, and an actuating stylus member for said ring to vary said pressure contacts.

14. An electric transmitter comprising an elastic ring supported at its circumference and deformable in its own plane for vibratory movement, a stylus member connected to said ring at a point substantially diametrically opposite said point of support, and a pair of microphones supported independently of said ring and operatively associated therewith at points substantially diametrically opposite, so that the vibrations of said ring produce corresponding pressure variations in said microphones.

15. An electric transmitter comprising an elastic ring supported at its circumference and deformable in its own plane for vibratory movement, a stylus member connected to said ring at a point substantially diametrically opposite said point of support, a pair of contact members carried by said ring at diametrically opposite points on a diameter substantially at right angles to the diameter passing through said point of support and the connecting point of said actuating means, and microphones supported independently of said ring and arranged to be operated by said contact members.

16. An electric transmitter comprising an elastic ring supported at its circumference and deformable in its own plane for vibratory movement, a stylus member connected to said ring at a point substantially diametrically opposite said point of support, a pair of microphones supported independently of said ring and in contact therewith at points substantially diametrically opposite, so that the vibrations of said ring produce corresponding pressure variations in said microphones, and means for adjusting the normal pressure contact between said ring and said microphones.

17. An electric phonograph pickup comprising a casing, a microphone carried by said casing, a vibratory elastic member mounted on said casing in pressure contact with said microphone which is supported independently of said elastic member, and a stylus for actuating said elastic member to operate said mircrophone.

18. An electric phonograph pickup comprising the combination of an elastic ring supported to vibrate in its own plane by deformational movements, a stylus connected to said ring for vibrating the same, and a microphone supported independently of said ring and arranged to be operated by the vibrations thereof.

19. An electric phonograph for vertical-cut records comprising an elastic ring supported at its circumference in substantially vertical position, a stylus connected to said ring at the bottom thereof to vibrate the ring by deformational movements in its own plane, and microphonic means supported independently of said ring and operated by the vibrations thereof.

20. An electric phonograph pickup for vertical-cut records comprising an elastic ring supported at the top of its circumference in substantially vertical position, a stylus mounted on said ring at a point diametrically opposite said point of support for vibrating said ring by deformational movements in its own plane, and microphone mechanism supported independently of said ring and in operative contact therewith.

21. An electric phonograph pickup for vertical-cut records comprising an elastic ring supported at the top of its circumference in substantially vertical position, a stylus mounted on said ring at a point diametrically opposite said point of support for vibrating said ring by deformational movements in its own plane, and a pair of microphones supported independently of said ring and in operative contact therewith at diametrically opposite points.

ADOLPH A. THOMAS.